US012715221B2

(12) United States Patent
Igarashi

(10) Patent No.: US 12,715,221 B2
(45) **Date of Patent: *Aug. 25, 2026**

(54) TANK FOR STORING LIQUID SUPPLIED TO LIQUID CONSUMING APPARATUS

(71) Applicant: BROTHER KOGYO KABUSHIKI KAISHA, Nagoya (JP)

(72) Inventor: Akinori Igarashi, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 162 days.

This patent is subject to a terminal disclaimer.

(21) Appl. No.: 18/627,970

(22) Filed: Apr. 5, 2024

(65) Prior Publication Data

US 2024/0336069 A1 Oct. 10, 2024

Related U.S. Application Data

(63) Continuation of application No. 17/929,363, filed on Sep. 2, 2022, now Pat. No. 11,970,008, which is a (Continued)

(30) Foreign Application Priority Data

Jun. 12, 2014 (JP) ................................ 2014-121856

(51) Int. Cl.
*B41J 2/175* (2006.01)

(52) U.S. Cl.
CPC ........... *B41J 2/17553* (2013.01); *B41J 2/175* (2013.01); *B41J 2/17513* (2013.01); *B41J 2/1752* (2013.01); *B41J 2/17503* (2013.01)

(58) Field of Classification Search
CPC .... B41J 2/17553; B41J 2/175; B41J 2/17513; B41J 2/1752; B41J 2/17503
See application file for complete search history.

(56) References Cited

U.S. PATENT DOCUMENTS 5,386,224 A 1/1995 Deur
6,457,793 B1 10/2002 Su
(Continued)

FOREIGN PATENT DOCUMENTS

CN 103568581 A 2/2014
CN 103722891 A 4/2014
(Continued)

OTHER PUBLICATIONS

Non-Final Office Action for related U.S. Appl. No. 14/735,864, mailed Feb. 1, 2016, 15 pages.
(Continued)

*Primary Examiner* — Lisa Solomon
(74) *Attorney, Agent, or Firm* — Merchant & Gould P.C.

(57) ABSTRACT

A tank includes: a wall defining a liquid storage chamber, the wall including: an upper wall defining an upper end of the liquid storage chamber, a lower wall defining a lower end of the liquid storage chamber, and an erected wall between the upper wall and the lower wall and through which the liquid inside the liquid storage chamber is visible from outside of the tank; an inlet penetrating through the upper wall or the erected wall; and an outlet, wherein the lower wall includes an upper stage wall making contact with the erected wall; a lower stage wall located at a position separated and away from the erected wall and below the upper stage wall; and a connecting wall connecting the upper and lower stage walls; and the outlet is disposed below the upper stage wall.

10 Claims, 11 Drawing Sheets

Related U.S. Application Data continuation of application No. 17/175,902, filed on Feb. 15, 2021, now Pat. No. 11,433,682, which is a continuation of application No. 16/895,215, filed on Jun. 8, 2020, now Pat. No. 10,919,306, which is a continuation of application No. 16/376,384, filed on Apr. 5, 2019, now Pat. No. 10,675,880, which is a continuation of application No. 16/105,070, filed on Aug. 20, 2018, now Pat. No. 10,252,537, which is a continuation of application No. 15/726,787, filed on Oct. 6, 2017, now Pat. No. 10,052,879, which is a continuation of application No. 15/276,049, filed on Sep. 26, 2016, now Pat. No. 9,782,975, which is a continuation of application No. 14/735,864, filed on Jun. 10, 2015, now Pat. No. 9,457,581.

(56) References Cited

U.S. PATENT DOCUMENTS

| | | | | |
|---|---|---|---|---|
| D836,113 | S | 12/2018 | Kimura et al. | |
| 2008/0158312 | A1 | 7/2008 | Kaga | |
| 2012/0038719 | A1 | 2/2012 | Shimizu et al. | |
| 2012/0125481 | A1 * | 5/2012 | Matsumoto .......... | B41J 2/17506 141/18 |
| 2013/0169720 | A1 | 7/2013 | Nakamura et al. | |
| 2014/0043408 | A1 | 2/2014 | Kudo et al. | |
| 2014/0104349 | A1 | 4/2014 | Kimura et al. | |
| 2015/0124028 | A1 | 5/2015 | Kimura et al. | |
| 2015/0283816 | A1 | 10/2015 | Kimura et al. | |
| 2016/0200111 | A1 | 7/2016 | Kimura et al. | |

FOREIGN PATENT DOCUMENTS

| | | | |
|---|---|---|---|
| EP | 1552940 | A2 | 7/2005 |
| JP | 2008-23814 | A | 2/2008 |
| JP | 2014-058085 | A | 6/2012 |
| JP | 2013-139140 | A | 7/2013 |
| JP | 2014-54826 | A | 3/2014 |
| JP | 2012-106363 | A | 4/2014 |

OTHER PUBLICATIONS

Notice of Allowance for related U.S. Appl. No. 14/735,864, mailed Jun. 6, 2016, 8 pages.

Notice of First Office Action issued in related Chinese Patent Application No. 201510303411.2, mailed Oct. 25, 2017.

Notice of Reasons for Rejection issued in related Japanese Patent Application No. 2014-121856, Mar. 13, 2018.

Office Action issued in related Chinese Patent Application 201810791594.0, Oct. 8, 2019.

Notice of Allowance issued in related U.S. Appl. No. 16/376,384, mailed on Feb. 6, 2020.

IP.com search (Year: 2020).

Notification of Second Office Action issued in corresponding Chinese Patent Application No. 201810791594.0, Jul. 3, 2020.

Notice of Allowance issued in parent U.S. Appl. No. 16/895,215 on Oct. 13, 2020.

IP.com search (Year: 2022).

Machine Translation of Anderson et al., "Partition Structures For The Interior Of An Ink Container", Jul. 13, 2005, Abstract, Fig. 3 (Year: 2005).

Notice of Allowance issued in U.S. Appl. No. 17/92,363 on Dec. 28, 2023.

* cited by examiner

TANK FOR STORING LIQUID SUPPLIED TO LIQUID CONSUMING APPARATUS

REFERENCE TO RELATED APPLICATIONS

The present application is a continuation of U.S. patent application Ser. No. 17/929,363, filed on Sep. 2, 2022, now U.S. Pat. No. 11,970,008, which is a continuation of U.S. patent application Ser. No. 17/175,902, filed on Feb. 15, 2021, now U.S. Pat. No. 11,433,682, which is a continuation of U.S. patent application Ser. No. 16/895,215, filed Jun. 8, 2020, now U.S. Pat. No. 10,919,306, which is a continuation of U.S. patent application Ser. No. 16/376,384, filed Apr. 5, 2019, now U.S. Pat. No. 10,675,880, which is a continuation of U.S. patent application Ser. No. 16/105,070, filed Aug. 20, 2018, now U.S. Pat. No. 10,252,537, which is a continuation of U.S. patent application Ser. No. 15/726,787, filed Oct. 6, 2017, now U.S. Pat. No. 10,052,879, which is a continuation of U.S. patent application Ser. No. 15/276,049 filed on Sep. 26, 2016, now U.S. Pat. No. 9,782,975, which is a continuation of U.S. patent application Ser. No. 14/735,864 filed on Jun. 10, 2015, now U.S. Pat. No. 9,457,581, all of which further claim priority from Japanese Patent Application No. 2014-121856 filed on Jun. 12, 2014. The entire contents of the priority applications are incorporated herein by reference.

BACKGROUND ART

Conventionally, an ink-jet printer, etc., as an example of a liquid consuming apparatus including a liquid consuming section configured to consume a liquid stored in a liquid storage chamber is known. For example, an ink-jet printer including an ink tank which stores an ink, and a liquid jetting section which jets the ink supplied from the ink tank via a liquid delivery (lead-out) section is known. Further, the ink tank is configured such that the liquid can be replenished (refilled) to the ink tank from an inlet provided on the upper surface of a liquid container.

SUMMARY

In the ink tank described above, the liquid lead-out section is arranged at a position over (on the upper side of) the bottom surface of the ink tank. Accordingly, in the case that the liquid level of the ink becomes lower than the position of the liquid lead-out section, there is a possibility that air might enter into and mix with an ink flow channel extending from the ink tank and arriving at the liquid jetting section. It is difficult, however, to make a user recognize that the ink needs to be replenished or refilled in a state that the ink is still stored in the space between the liquid lead-out section and the bottom surface of the ink tank.

The present teaching has been made in view of the above-described circumstances; an object of the present teaching is to provide a tank that is configured to be replenished with a liquid via an inlet, wherein any entering and mixing of the air with and into the liquid outflowed via an outlet port is reduced.

According to an aspect of the present teaching, a tank configured to store a liquid to be supplied to a liquid consuming apparatus is provided. The tank includes a wall, an inlet, an outlet, and a liquid lead-out channel. The wall defines a liquid storage chamber configured to store the liquid. The wall includes: an upper wall extending in a front-rear direction; a front wall extending in an upper-lower direction, the front wall being located below the upper wall in the upper-lower direction; a first lower wall extending rearward from a lower end of the front wall; and a second lower wall extending rearward from a position away rearward from the front wall. The second wall is located below the first lower wall in the upper-lower direction. The inlet penetrates through the upper wall or the front wall and via which the liquid is flowed into the liquid storage chamber. The liquid is flowed out via the outlet. The liquid lead-out channel is configured to flow the liquid flowed out from the outlet to the liquid consuming apparatus. The outlet is located between the first lower wall and the second lower wall in the upper-lower direction.

According to the above configuration, the situation that the liquid level of the liquid stored in the liquid storage chamber is lowered as low as the position of the upper stage wall can be utilized to cause a user who is visually observing the inside of the liquid storage chamber through the erected wall, to recognize the necessity for replenishing the liquid. Further, although the liquid is still stored in a space surrounded by the lower stage wall and the connecting wall, the outlet is disposed of in this space. This contributes to reduce any mixing and entering of the air into the liquid, which flows out via the outlet.

BRIEF DESCRIPTION OF DRAWINGS

FIG. 1A and FIG. 1B are external perspective views of a multi-function peripheral 10, wherein FIG. 1A depicts a state in which a cover 70 is closed, and FIG. 1B depicts a state in which the cover 70 is open.

FIGS. 11A and 11B are views illustrating the positional relationship between a partition wall 135B and an upper limit indicating line 138, wherein FIG. 11A is a front view of the ink tank 100 at a position of the ink chamber 111B and FIG. 11B is a perspective view of the longitudinal cross-section of the ink chamber 111B.

DESCRIPTION

An embodiment of the present teaching will be described below. Note that, however, the embodiment described below is merely an example of the present teaching; it goes without saying that it is possible to make any appropriate changes in the embodiment of the present teaching without departing from the gist and scope of the present teaching. In the following description, upward and downward are each a component of an up-down direction 7 and are opposite to each other; leftward and rightward are each a component of a left-right direction 9 and are opposite to each other; and frontward and rearward are each a component of a front-rear direction 8 and are opposite to each other. Further, in the embodiment, the up-down direction 7 corresponds to the vertical direction, and each of the front-rear direction 8 and the left-right direction 9 corresponds to the horizontal direction.

Figure 1A:
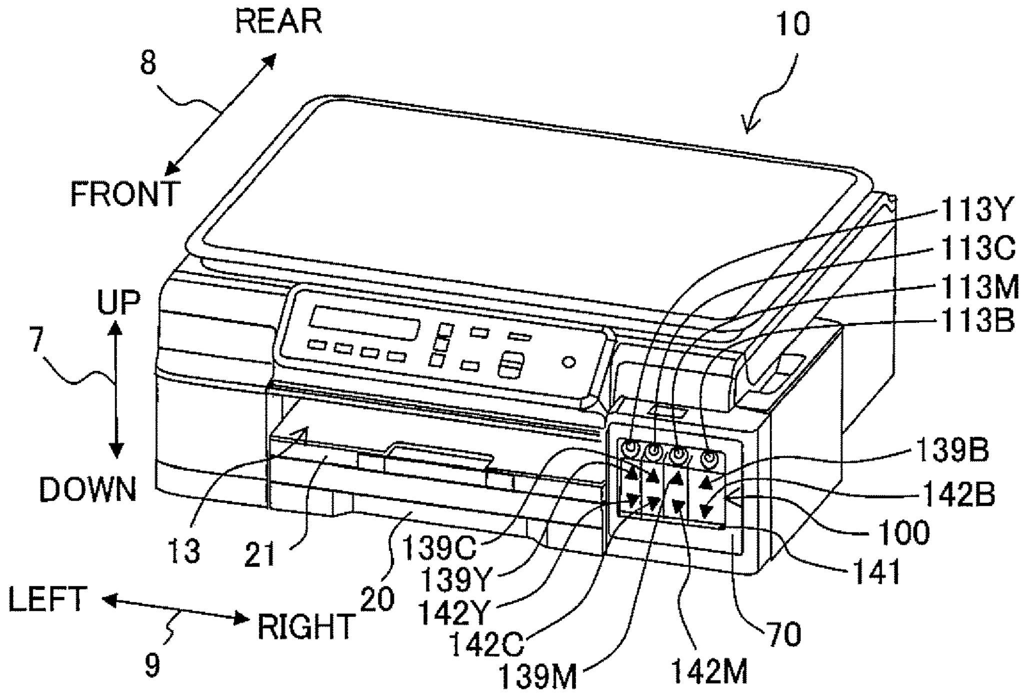

Furthermore, the up-down direction 7 is defined as a state in which a multi-function peripheral 10 is usably installed or a posture in which the multi-function peripheral 10 is usably installed as the reference. Note that the state that the multi-function periphery 10 is usably installed as depicted in FIG. 1A will be referred to as a "usable state". Moreover, the posture in which the multi-function peripheral 10 is usably installed, as depicted in FIG. 1A will be referred to as a "usable posture". Further, the front-rear direction 8 is defined such that a side on which an opening 13 of the multi-function peripheral 10 is provided is designated as the frontward side (front surface or front side), and the left-right direction 9 is defined as viewing the multi-function peripheral 10 from the frontward side (front surface). The front-rear direction 8 is an example of a first direction, and the left-right direction 9 is an example of a second direction.

[Overall Configuration of Multi-Function Peripheral 10]

Figure 1B:
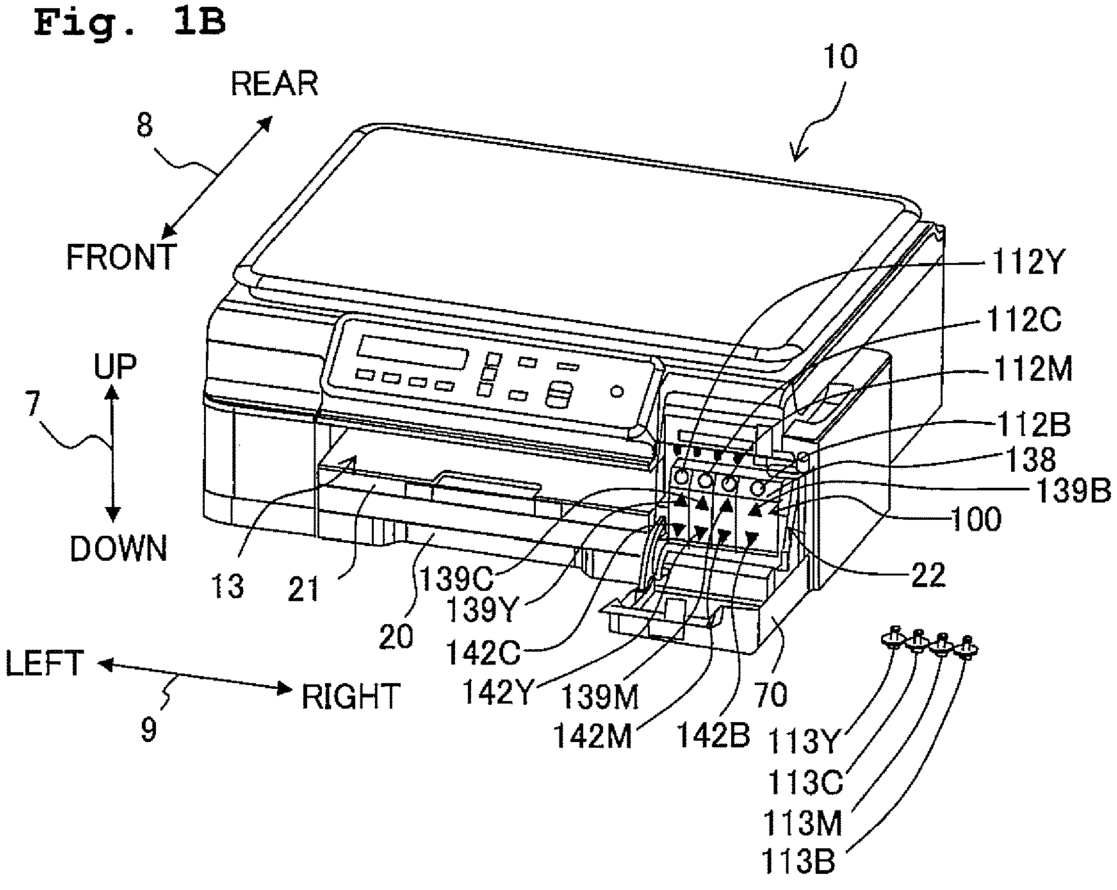
Figure 2:
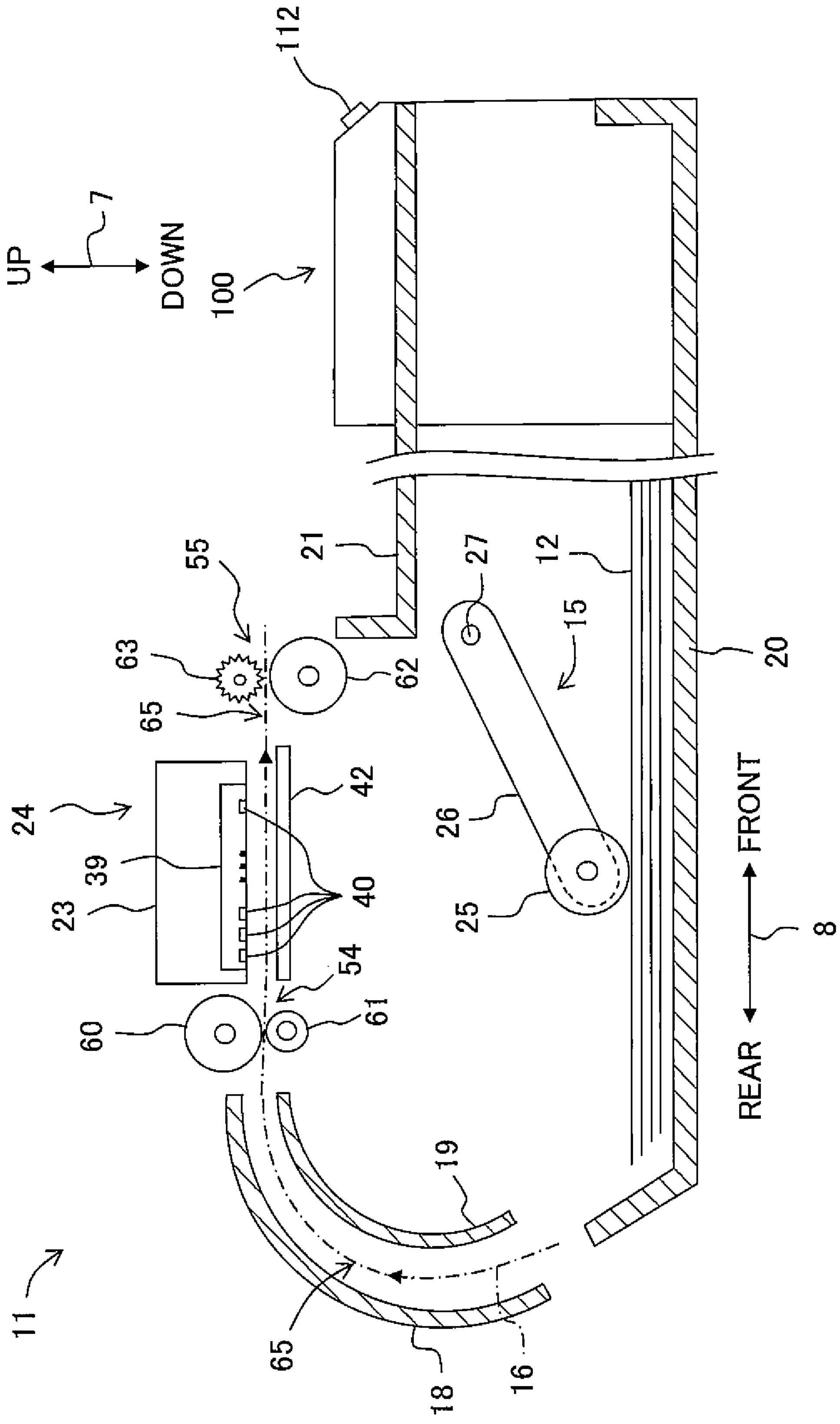
FIG. 2 is a vertical cross-sectional view schematically depicting the internal structure of a printer unit 11.

As depicted in FIGS. 1A and 1B, the multi-function peripheral 10 is formed to have a substantially rectangular parallelepiped shape. The multi-function peripheral 10 includes, at a lower portion of the casing of the multi-function peripheral 10, a printer unit 11, which records an image onto a paper 12 (see FIG. 2) by an ink-jet recording method. As depicted in FIG. 2, the printer unit 11 includes a feeding section 15, a feeding tray 20, a discharge tray 21, a conveyance roller section 54, a recording section 24, a discharge roller section 55, a platen 42, and an ink tank 100 (an example of a tank). Further, the multi-function peripheral 10 has various functions, such as a facsimile function and a print function. The multi-function peripheral 10 is an example of a liquid discharge apparatus or a liquid consuming apparatus.

[Feeding Tray 20, Discharge Tray 21]

As depicted in FIGS. 1A and 1B, the feeding tray 20 is inserted into and removed from the multi-function peripheral 10 by a user in the front-rear direction 8 through the opening 13. The opening 13 is formed in a central portion in the left-right direction 9 of the front surface of the multi-function peripheral 10. The feeding tray 20 is capable of supporting a plurality of sheets of the paper 12 that is stacked in the feeding tray 20. The discharge tray 21 is arranged at a position at the upper side of the feeding tray 20 and is inserted or removed together with the feeding tray 20. The discharge tray 21 supports the paper 12 discharged through a space between the recording section 24 and the platen 42 by the discharge roller section 55.

[Feeding Section 15]

The feeding section 15 feeds the paper 12 supported by the feeding tray 20 to a conveyance route 65. As depicted in FIG. 2, the feeding section 15 includes a feeding roller 25, a feeding arm 26, and a shaft 27. The feeding roller 25 is rotatably supported by the feeding arm 26 at the front end thereof. The feeding roller 25 rotates in a direction that causes paper 12 to be conveyed in a conveyance direction 16 when a conveyance motor (not depicted in the drawings) is reversely rotated. In the following description, the rotations of the feeding roller 25, a conveyance roller 60, and a discharge roller 62 in the direction for causing the paper 12 to be conveyed in the conveyance direction 16 are each referred to as "normal rotation". The feeding arm 26 is pivotably supported by the shaft 27 supported by the frame of the printer unit 11. A bias is applied to the feeding arm 26 by an elastic force of a spring or by the self-weight of the feeding arm 26 such that the feeding arm 26 is pivoted and urged toward the feeding tray 20.

[Conveyance Route 65]

Figure 3:
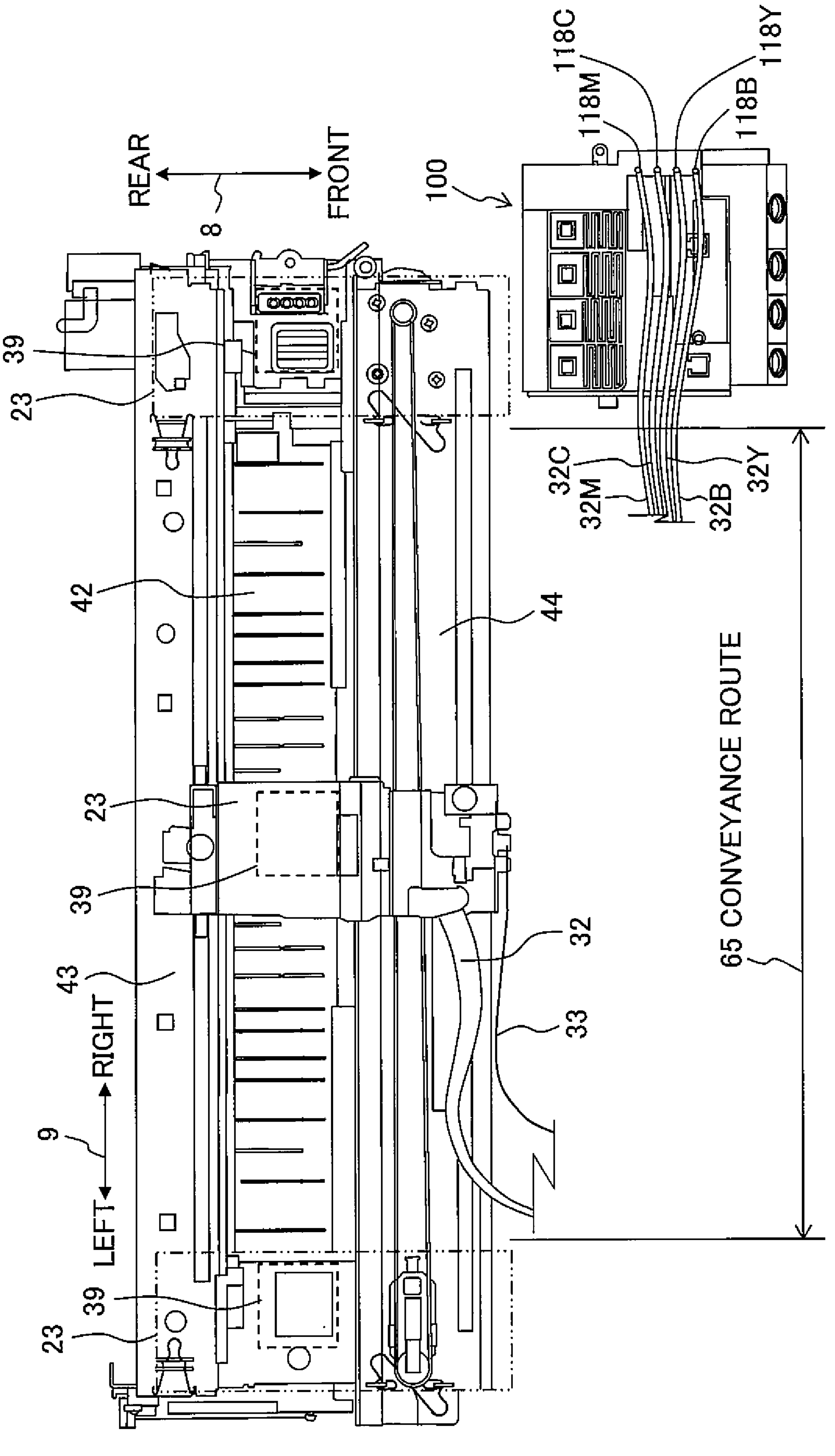
FIG. 3 is a plan view depicting the arrangement of a carriage 23 and an ink tank 100.

As depicted in FIG. 2, in the interior of the printer unit 11, a space is defined by an outer guide member 18 and an inner guide member 19 which are arranged to face with each other with a predetermined gap intervened therebetween. This space constructs a portion of a conveyance route 65. The conveyance route 65 is a route or path that is extended from a rear-end portion of the feeding tray 20 toward the rear side of the printer unit 11. Further, the conveyance route 65 makes a U-turn while being extended from the lower side to the upper side, at the rear side of the printer unit 11; and then the conveyance route 65 reaches the discharge tray 21 via a space between the recording section 24 and the platen 42. As depicted in FIGS. 2 and 3, a portion of the conveyance route 65 between the conveyance roller section 54 and the discharge roller section 55 is provided at a substantially central portion in the left-right direction 9 of the multi-function peripheral 10 and is extended in the front-rear direction 8. Note that in FIG. 2, the conveyance direction 16 of the paper 12 in the conveyance route 65 is indicated by an arrow of a dashed-dotted line.

[Conveyance Roller Section 54]

As depicted in FIG. 2, the conveyance roller section 54 is arranged at the upstream side of the recording head 24 in the conveyance direction 16. The conveyance roller section 54 includes the conveyance roller 60 and a pinch roller 61, which are facing each other. The conveyance roller 60 is driven by a conveyance motor. The pinch roller 61 rotates following the rotation of the conveyance roller 60. The paper 12 is conveyed in the conveyance direction 16 by being pinched between the conveyance roller 60 and the pinch roller 61 which are rotated positively by the normal rotation of the conveyance motor.

[Discharge Roller Section 55]

As depicted in FIG. 2, the discharge roller section 55 is arranged at the downstream side of the recording head 24 in the conveyance direction 16. The discharge roller section 55 includes the discharge roller 62 and a spur 63, which face each other. The discharge roller 62 is driven by the conveyance motor. The spur 63 rotates following the rotation of the discharge roller 62. The paper 12 is conveyed in the conveyance direction 16 by being pinched between the discharge roller 62 and the spur 63 which are rotated positively by the normal rotation of the conveyance motor.

[Recording Section 24]

As depicted in FIG. 2, the recording section 24 is arranged between the conveyance roller section 54 and the discharge roller section 55 in the conveyance direction 16. Further, the platen 42 and the recording section 24 are arranged to face each other in the up-down direction 7, while sandwiching the conveyance route 65 therebetween. Namely, the recording section 24 is arranged at a position at which the recording section 24 is located above the conveyance route 65 in the up-down direction 7 and at which the recording section 24 faces the conveyance route 65. The recording section 24 includes a carriage 23 and a recording head 39 (an example of a head or a liquid consuming section).

As depicted in FIG. 3, the carriage 23 is supported by guide rails 43 and 44 which are extended respectively in the left-right direction 9, at positions separated respectively in the front-rear direction 8. The guide rails 43 and 44 are supported by the frame of the printer unit 11. The carriage 23 is connected to a known belt mechanism disposed on the guide rail 44. The belt mechanism is driven by a carriage motor (not depicted in the drawings). Namely, the carriage

23 connected to the belt mechanism reciprocates in the left-right direction 9 by being driven by the carriage motor. As depicted by alternate long and short dash lines in FIG. 3, the range of movement of the carriage 23 spans beyond the left and right end sides of the conveyance route 65 in the left-right direction 9.

Further, an ink tube 32, which connects the ink tank 100 and the recording head 39, and a flexible flat cable 33, which electrically connects the recording head 39, and a control circuit board having a controller (not depicted in the drawings) mounted thereon are extended from the carriage 23. The ink tube 32 supplies an ink stored in the ink tank 100 to the recording head 39. More specifically, four ink tubes 32B, 32M, 32C, and 32Y, via which inks of respective colors (which are, for example, black, magenta, cyan, and yellow colors) are distributed, are extended from the ink tank 100 and are connected to the carriage 23 in a bundled form. In the following description, these four ink tubes 32B, 32M, 32C, and 32Y will be collectively referred to as "ink tube(s) 32" in some cases. The flexible flat cable 33 transmits a control signal outputted from the controller to the recording head 39.

As depicted in FIG. 2, the recording head 39 is installed on the carriage 23. A plurality of nozzles 40 is formed on the lower surface of the recording head 39. End portions (tip portions) of the nozzles 40 are exposed from the lower surface of the recording head 39 and from the lower surface of the carriage 23 on which the recording head 39 is installed. In the following description, the surface through which the end portions of the nozzles 40 are exposed will be referred to as a "nozzle surface" in some cases. The recording head 39 jets or discharges the ink as fine ink droplets (minute ink droplets) through the nozzles 40. In the process of movement of the carriage 23, the recording head 39 jets the ink droplets toward the paper 12 supported by the platen 42. Accordingly, an image, etc. is recorded on the paper 12.

[Platen 42]

As depicted in FIGS. 2 and 3, the platen 42 is arranged between the conveyance roller section 54 and the discharge roller section 55 in the conveyance direction 16. The platen 42 is arranged so as to face the recording section 24 in the up-down direction 7, and supports the paper 12, conveyed by the conveyance roller section 54, from therebelow.

[Ink Tank 100]

As depicted in FIGS. 1A and 1B, the ink tank 100 is accommodated in the multi-function peripheral 10. The ink tank 100 is fixed to the multi-function peripheral 10, so the ink tank 100 cannot be easily removed from the multi-function peripheral 10. More specifically, the ink tank 100 is accommodated inside the multi-function peripheral 10 through an opening 22 formed in the front surface of the casing of the multi-function peripheral 10 at the right end of the front surface in the left-right direction 9. The opening 22 is adjacent to the opening 13 in the left-right direction 9. Note that, however, the front surface (a portion of a base wall 101A and a portion of an inclined wall 101B, which will be described later on) of the ink tank 100 is located in front of (ahead of) the opening 22 in the front-rear direction 8 (more specifically, located in front of a portion of the front wall of the casing defining the opening 22).

Further, the multi-function peripheral 10 is provided with a box-shaped cover 70 capable of covering the front surface, of the ink tank 100, located in front of the opening 22. The cover 70 is pivotable between a cover position at which the cover 70 covers the opening 22 and the front surface of the ink tank 100 (see FIG. 1A), and an exposure position at which the cover 70 allows the opening 22 and the front surface of the ink tank 100 to be exposed to the outside of the multi-function peripheral 10 at which the cover 70 does not cover the opening 22 and the front surface of the ink tank 100 (see FIG. 1B). The cover 70 in this embodiment is supported by the casing of the multi-function peripheral 10 to be pivotable about a pivot shaft extended in the left-right direction 9 at a lower end portion in the up-down direction 7.

Figure 4:
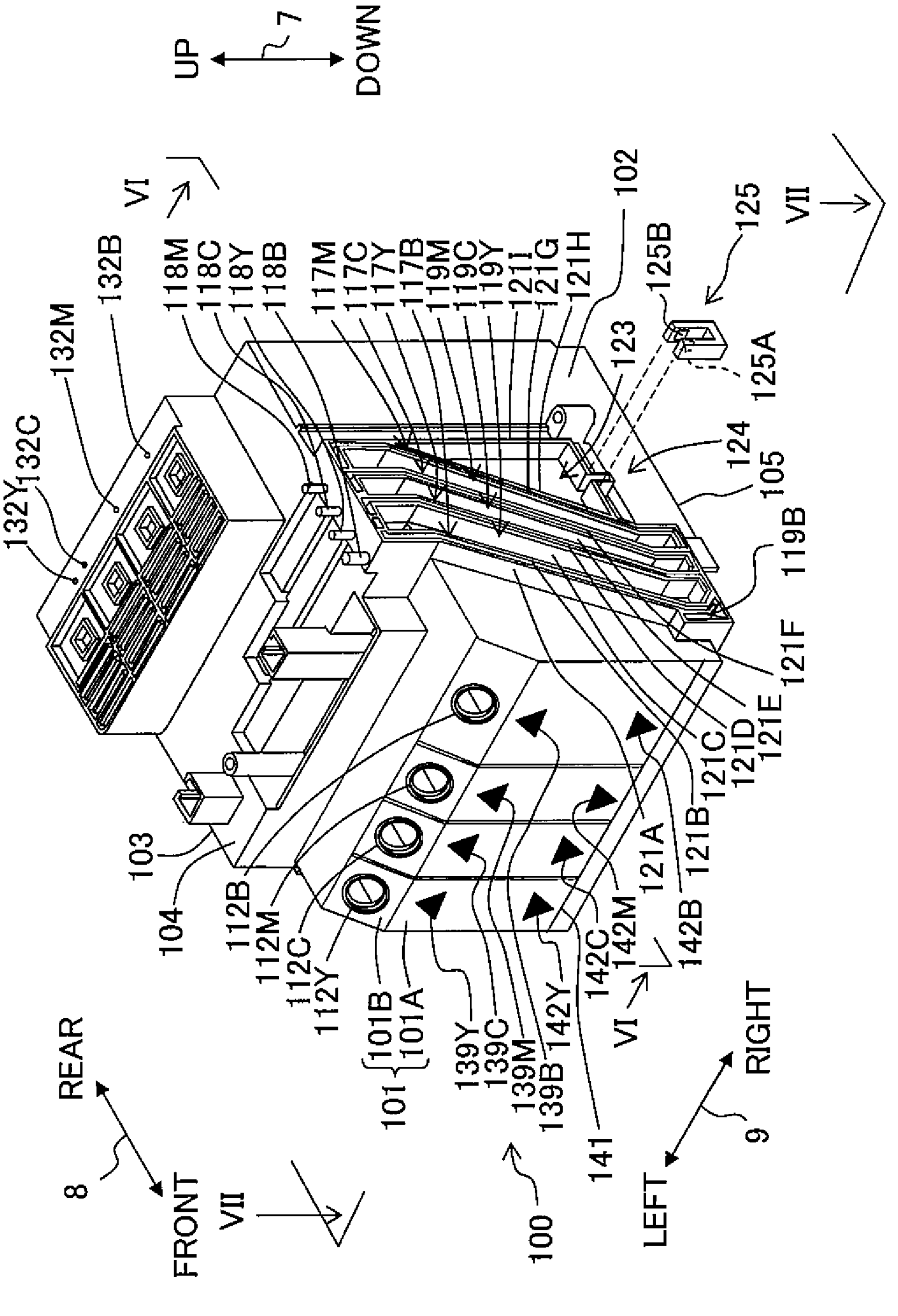
FIG. 4 is a front perspective view of the ink tank 100.
Figure 5:
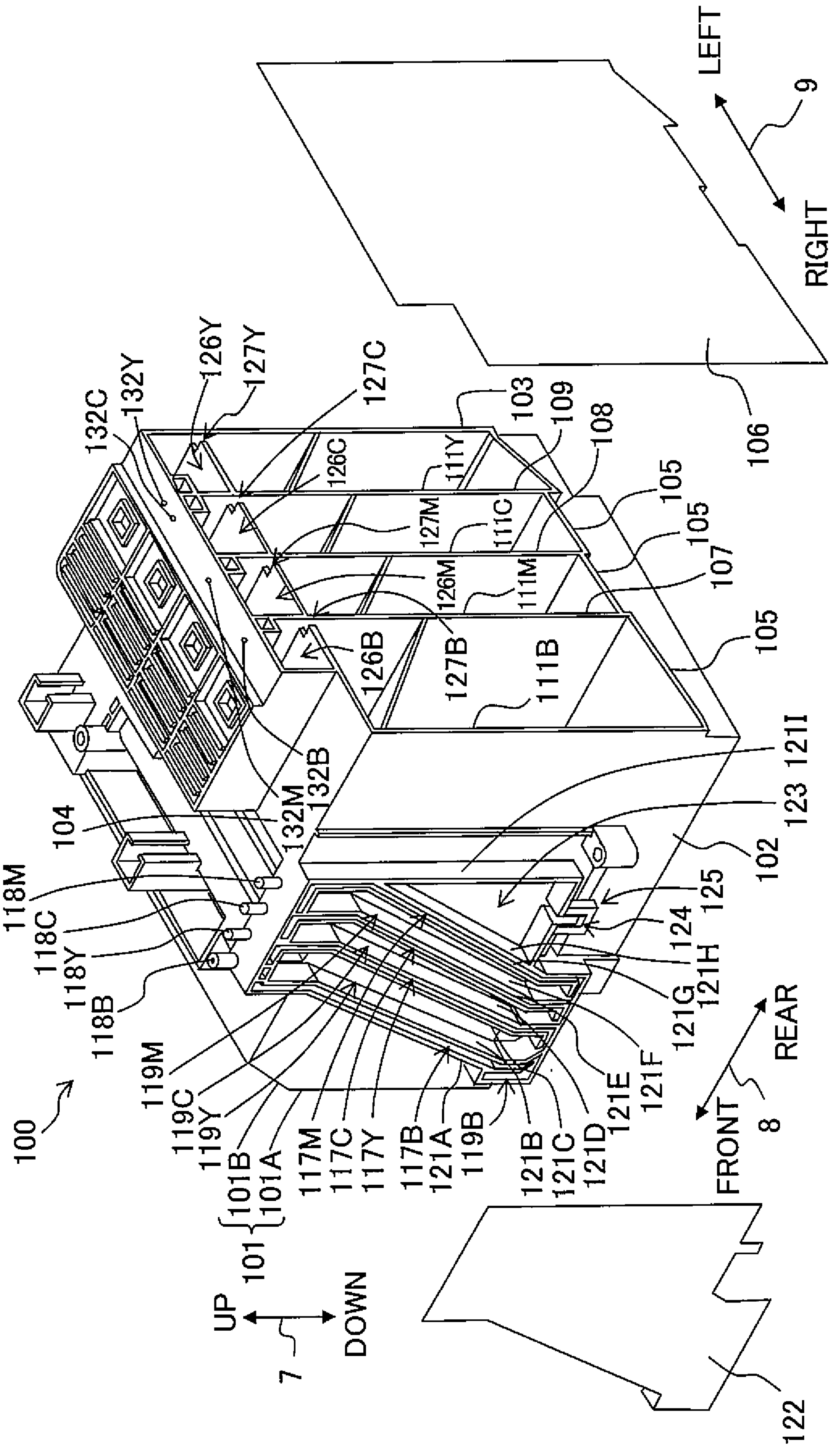
FIG. 5 is a rear perspective view of the ink tank 100.

As depicted in FIGS. 4 and 5, the ink tank 100 has a substantially rectangular parallelepiped shape. The ink tank 100 has a front wall 101, a right wall 102, a left wall 103, an upper wall 104, and a lower wall 105. On the other hand, the rear surface of the ink tank 100 is released or uncovered. Further, by fixing a film 106 by welding to rear-end surfaces of the right wall 102, the left wall 103, the upper wall 104, and the lower wall 105, the rear surface of the ink tank 100 is sealed. Namely, the film 106 forms the rear wall of the ink tank 100. The ink tank 100 having the above-described configuration is formed or shaped as an integrated part or component by, for example, performing injection-molding with a resin material. For example, the inner shape or profile of the ink tank 100 (to be described later on) is defined by an unillustrated mold (metal mold), which is pulled out in the rearward direction from the open or uncovered rear surface of the ink tank 100.

The upper wall 104 defines or demarcates the upper end of an ink chamber 111 in the up-down direction 7. The front wall 101, the right wall 102 and the left wall 103 each as an example of the erected wall are provided upstandingly between the upper wall 104 and the lower wall 105 in a direction crossing the upper and lower walls 104 and 105. Further, each of the walls 101 to 105 has at least light transmittance or translucency to such an extent that the ink inside the ink chamber 111 is visible (visually observable or recognizable) from the outside of the ink tank 100. The front wall 101, which defines the front end of the ink chamber 111 (an example of an end of the ink chamber 111 in the first direction), is constructed of a base wall 101A extending from the lower wall 105 substantially in the up-down direction 7 and an inclined wall 101B which is connected or continued to the upper end of the base wall 101A and which is inclined relative to the up-down direction 7 and the front-rear direction 8. The inclined wall 101B is inclined rearward relative to the base wall 101A. Further, the front wall 101 has a lower limit indicating line 141 and information signs 139 and 142, which are formed on the front wall 101.

An upper limit indicating line 138 is a line for instructing a user, a position to be defined as the upper limit of the liquid level of the ink to be charged into the ink chamber 111 via an inlet 112. The upper limit indicating line 138 is extended substantially linearly along the left-right direction 9. Note that in this specification, in a case that " . . . extends/extend in a certain direction", there is no limitation to such a state of being completely matching with the certain direction, but a difference to some extent is allowable. The information sign 139 is a sign that informs the purpose of the upper limit, indicating line 138. The information sign 139 of the embodiment is an equilateral triangle wherein one of the apexes is oriented upward in the vertical direction. Note that, however, the specific shape of the information sign 139 is not limited to this. For example, wordings such as "Full", "100", etc., may be used in such a manner that the user can understand that the upper limit indicating line 138 informs a position to be designated as the upper limit of the liquid level of the ink.

The lower limit indicating line 141 is a line for instructing the user, a position to be defined as the lower limit of the liquid level of the ink to be stored in the ink chamber 111. The lower limit indicating line 141 is extended substantially linearly along the left-right direction 9. The information sign 142 is a sign that informs the purpose of the lower limit, indicating line 141. The information sign 142 of the embodiment is an equilateral triangle wherein one of the apexes is oriented downward in the vertical direction. Note that, however, the specific shape of the information sign 142 is not limited to this. For example, wordings such as "Empty", "0 (zero)", etc., may be used in such a manner that the user can understand that the lower limit indicating line 141 informs a position to be maintained as the lower limit of the liquid level of the ink to be charged in the ink chamber 111.

Figure 7:
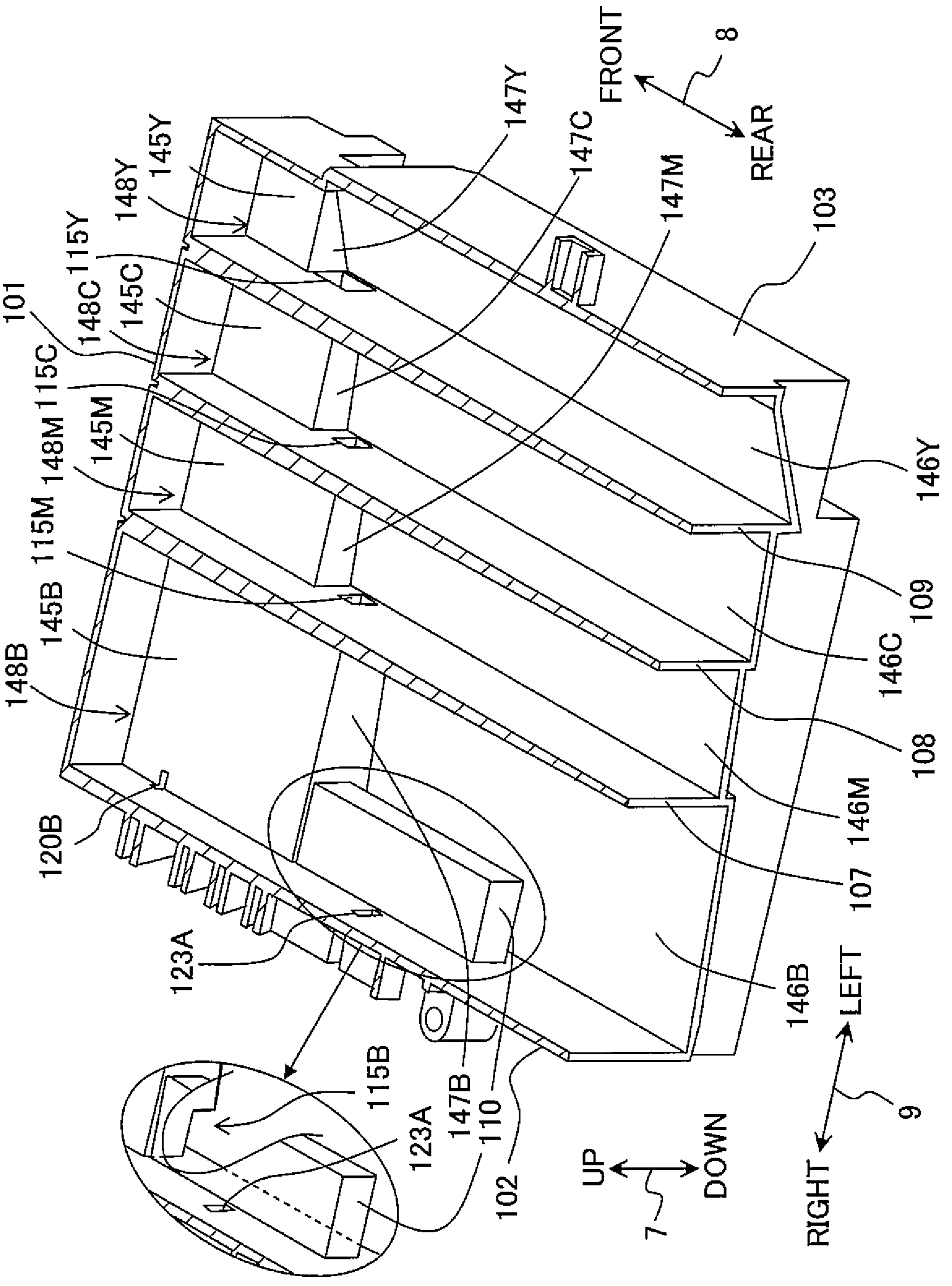
FIG. 7 is a cross-sectional perspective view along a line VII-VII in FIG. 4.

The lower wall 105 defines the lower end of the ink chamber 111 in the up-down direction 7. As depicted in FIG. 7, the lower wall 105 is constructed of an upper stage wall 145, a lower stage wall 146, and a connecting wall 147. The upper stage wall 145 makes contact with the inner surface of the front wall 101 (more specifically, the inner surface of the base wall 101A). The lower stage wall 146 makes contact with the inner surface of the film 106. The lower stage wall 146 is located at a position below the upper stage wall 145 and rearward of the upper stage wall 145. Namely, the lower stage wall 146 is arranged at a position separated and away from the base wall 101A. The connecting wall 147 connects the upper stage wall 145 and the lower stage wall 146 between the upper and lower stage walls 145, 146 in the front-rear direction 8. Specifically, the upper end of the connecting wall 147 is connected to the rear end of the upper stage wall 145, and the lower end of the connecting wall 147 is connected to the front end of the lower stage wall 146.

A base end portion 148B of an upper stage wall 145B extends along the left-right direction 9 in the entire area of an ink chamber 111B (to be described below). Further, the upper stage wall 145B extends in the horizontal direction from the base end portion 148B, namely, extends in a direction orthogonal to the base wall 101A of the front wall 101. Further, the base end portion 148B can be visible from the outside of the ink tank 100 through the front wall 101, which has light transmittance or translucency. Furthermore, the base end portion 148B of the embodiment functions as the lower limit, indicating line 141. Namely, in the embodiment, the position of the base end portion 148B and the position of the lower limit indicating line 141 in the up-down direction 7 coincide with each other. On the other hand, the information sign 142 is drawn on the outer surface of the front wall 101. Here, the term "the information sign 142 is drawn" or "draw the information sign 142" includes, for example, printing the information sign 142 on the outer surface of the front wall 101, adhering a tape, etc., which serves as the information sign 142 onto the outer surface of the front wall 101, and the like.

[Ink Chamber 111]

As depicted in FIG. 5, a plurality of partition walls 107, 108, and 109, which define or demarcate the internal space of the ink tank 100, is provided in the interior of the ink tank 100. Each of the partition walls 107, 108, and 109 is extended in the up-down direction 7 and the front-rear direction 8 and is connected to the front wall 101, the upper wall 104, the lower wall 105, and the film 106. Further, the partition walls 107, 108, and 109 are disposed to be separated and away from one another in the left-right direction 9. As a result, the internal space of the ink tank 100 is partitioned into four ink chambers, 111B, 111M, 111C, and 111Y, that are adjacent in the left-right direction 9. The ink chamber 111 is an example of a liquid storage chamber for storing ink to be jetted through the nozzles 40. The right wall 102 is an example of a side wall defining the right end of the ink chamber 111B, and the left wall 103 is an example of a side wall defining the left end of the ink chamber 111Y.

The ink chamber 111B is a space demarcated by the front wall 101, the right wall 102, the upper wall 104, the lower wall 105, the film 106, and the partition wall 107. The ink chamber 111M is a space demarcated by the front wall 101, the upper wall 104, the lower wall 105, the film 106, and the partition walls 107 and 108. The ink chamber 111C is a space demarcated by the front wall 101, the upper wall 104, the lower wall 105, the film 106, and the partition walls 108 and 109. The ink chamber 111Y is a space demarcated by the front wall 101, the left wall 103, the upper wall 104, the lower wall 105, the film 106, and the partition wall 109.

In the following description, the ink chambers 111B, 111M, 111C, and 111Y are collectively referred to as "ink chamber(s) 111" in some cases. Further, reference numerals having different alphabetic suffixes (B, M, C, and Y) are assigned to four components provided while corresponding to the ink chambers 111B, 111M, 111C, and 111Y, respectively; in the case that these components are collectively referred to, then these components are assigned with a reference numeral(s) while omitting the respective alphabetic suffixes, in some cases.

Inks of different colors are stored in the ink chambers 111, respectively. Specifically, black ink is stored in the ink chamber 111B, cyan ink is stored in the ink chamber 111C, magenta ink is stored in the ink chamber 111M, and yellow ink is stored in the ink chamber 111Y. Each of the color inks is an example of a liquid. However, the number of ink chambers 111 and the colors of the inks are not restricted to the number and the colors in the above-described example. The ink chambers 111 are arranged along the left-right direction 9. Further, among the four ink chambers 111B, 111M, 111C, and 111Y, the ink chamber 111B is arranged at the rightmost side, and the ink chamber 111Y is arranged at the leftmost side. Furthermore, the ink chamber 111B has a volume larger than any other ink chamber 111M, 111C, and 111Y.

[Inlet 112]

The inclined wall 101B of the ink tank 100 is provided with inlets 112B, 112M, 112C, and 112Y (hereinafter, collectively referred to as "inlet(s) 112") for allowing the inks to flow into the ink chambers 111, respectively. The inlet 112 penetrates through the inclined wall 101B in the direction of the thickness of the inclined wall 101B and makes the corresponding ink chamber 111 communicate with the outside of the ink tank 100. The inner surface of the inclined wall 101B faces the ink chamber 111, and the outer surface of the inclined wall 101B faces the outside of the ink tank 100. The inclined wall 101B is inclined such that the outer surface thereof is located at a position above the inner surface of the inclined wall 101B. Consequently, the inlet 112 allows the ink chamber 111 and the outside of the ink tank 100 to directly communicate with each other. Namely, between the inlet 112 and the ink chamber 111, there is no channel that is bent or curved and that has a cross-sectional area smaller than the cross-sectional area of the inlet 112. Further, it is allowable that the inlet 112 is formed in the upper wall 104 rather than in the inclined wall 101B.

The inclined wall 101B and the inlet 112 provided on the inclined wall 101B are exposed to the outside of the multi-function peripheral 10 when the cover 70 is positioned at the exposure position, as depicted in FIG. 1B. Further, the inlet 112 is formed on the inclined wall 101B to be in front of the opening 22. In the present embodiment, the posture of the ink tank 100 when the ink is refilled into the ink chamber 111 through the inlet 112 (refilling posture) coincides with the posture of the ink tank 100 when the multi-function peripheral 10 is in the usable posture. Namely, when the multi-function peripheral 10 is in the usable posture, the ink is refilled into the ink chamber 111 through the inlet 112.

The ink tank 100 has caps 113B, 113M, 113C, and 113Y (hereinafter collectively referred to as "cap(s) 113") that are detachably attached with respect to the inlets 112. As depicted in FIG. 1A, the cap 113 attached to the inlet 112 blocks or closes the inlet 112 by making tight contact with the periphery of the inlet 112. On the other hand, as depicted in FIG. 1B, in a case that the cap 113 is removed from the inlet 112, the inlet 112 is open or released. The cap 113 is attached to and removed or detached from the inlet 112 in a state that the cover 70 is located at the exposed position. Further, by removing the cap 113 from the inlet 112, the ink can be refilled into the ink chamber 111 via the inlet 112.

Further, as depicted in FIG. 1A, the cover 70 has an opening penetrating through a central portion of the cover 70 in the thickness direction thereof. Furthermore, the upper limit indicating line 138, the lower limit indicating line 141, and the information signs 139 and 142 disposed on the front wall 101 of the ink tank 100 are exposed to be visible from the outside of the multi-function peripheral 10 via the opening of the cover 70 located at the cover position.

[Ink Outflow Channel 114]

Ink outflow channels 114B, 114M, 114C, and 114Y (hereinafter collectively referred to as "ink outflow channel(s) 114"; an example of a liquid outflow channel) are connected to the ink chambers 111, respectively, as depicted in FIGS. 6 to 9B. The ink outflow channel 114 is a channel that allows the ink stored in the corresponding ink chamber 111 to flow out from the ink tank 100. The ink outflow channel 114 in the embodiment is a channel extending from the corresponding ink chamber 111 and arriving up to the right side surface of the ink tank 100 (namely, the outer surface of the right wall 102). Further, an opening 115 (to be described below) is an example of an outlet (outflow port) allowing the ink to outflow from the ink chamber 111.

Figure 8:
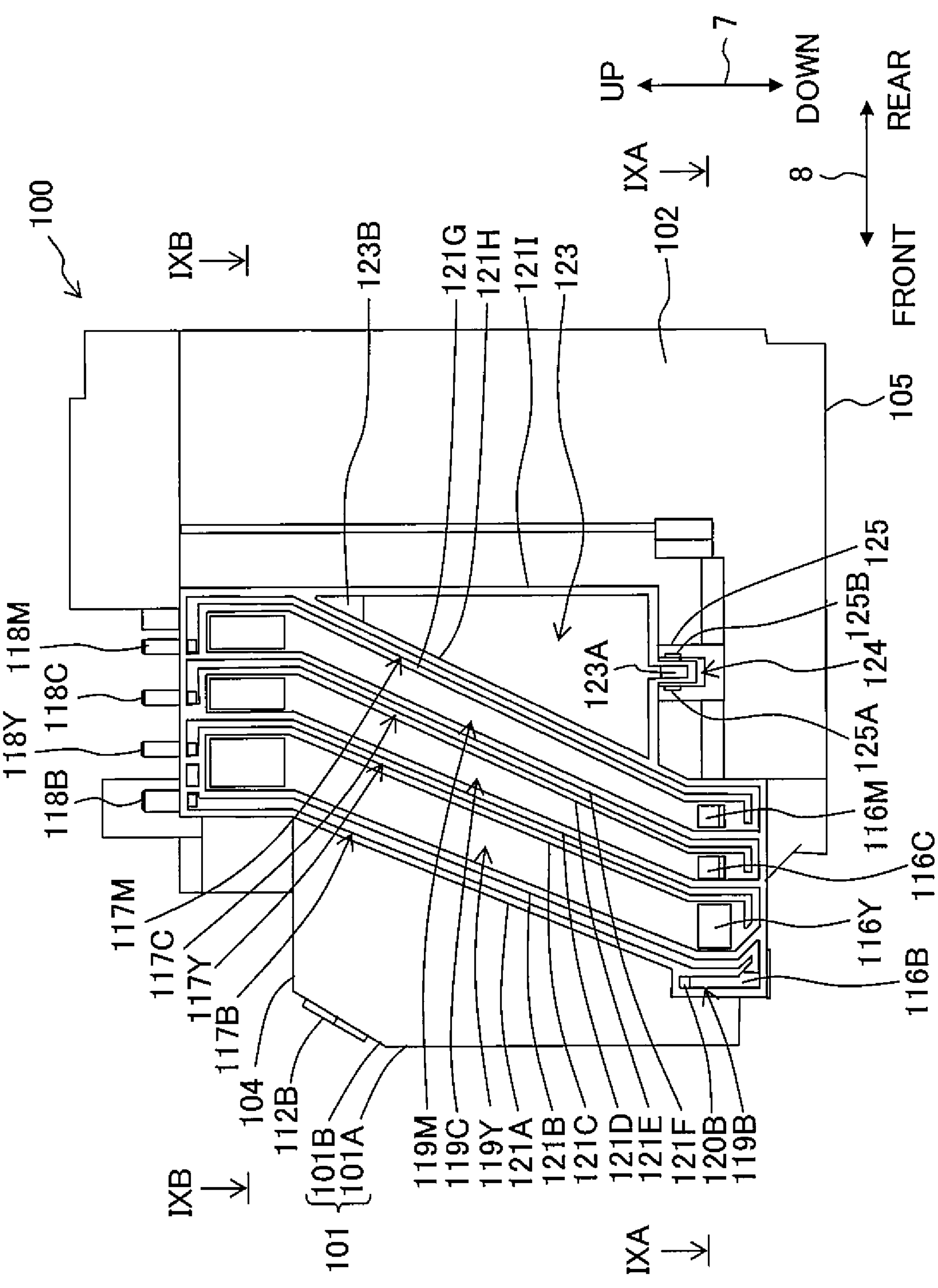
FIG. 8 is a right-side view of the ink tank 100.
Figure 9A:
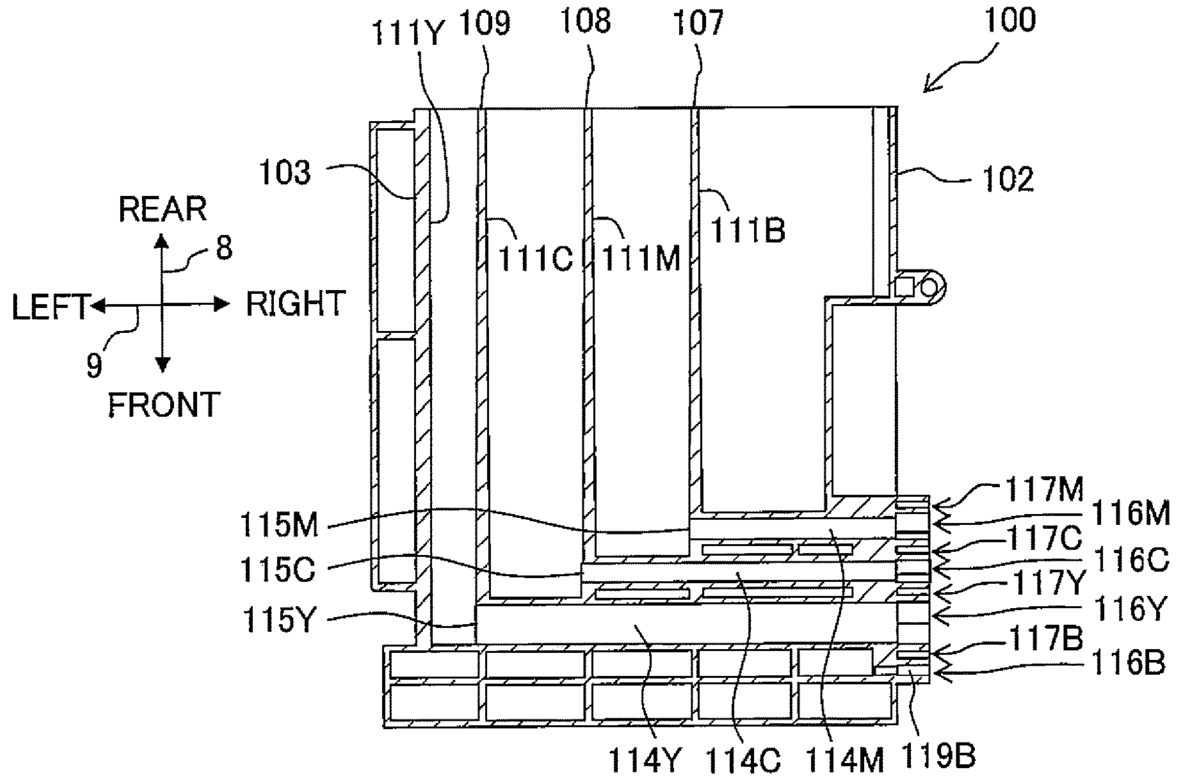
FIG. 9A is a cross-sectional view along a line IXA-IXA in FIG. 8

As depicted in FIG. 7, the ink outflow channel 114Y communicates with the ink chamber 111Y through an opening 115Y provided near the lower end of the partition wall 109 which demarcates the right surface of the ink chamber 111Y. The opening 115Y is formed in the partition wall 109 at a location surrounded by the lower stage wall 146Y and the connecting wall 147Y (more specifically, at a location below the upper stage wall 145Y and between the connecting walls 147Y and 147C in the front-rear direction 8). Further, as depicted in FIG. 8, the ink outflow channel 114Y reaches the right side surface of the ink tank 100 through an opening 116Y provided on the right wall 102. More specifically, as depicted in FIG. 9A, the ink outflow channel 114Y is formed to extend rightward along the left-right direction 9 from the opening 115Y at a location in front of the ink chambers 111B, 111M, and 111C, and reaches the opening 116Y penetrating through the right wall 102 (namely, reaches the right side surface of the ink tank 100).

As depicted in FIG. 7, the ink outflow channel 114C communicates with the ink chamber 111C through an opening 115C provided near the lower end of the partition wall 108 which demarcates the right surface of the ink chamber 111C. The opening 115C is formed in the partition wall 108 at a location surrounded by the lower stage wall 146C and the connecting wall 147C (more specifically, at a location below the upper stage wall 145C and between the connecting walls 147C and 147M in the front-rear direction 8). Further, as depicted in FIG. 8, the ink outflow channel 114C reaches the right side surface of the ink tank 100 through an opening 116C provided on the right wall 102. More specifically, as depicted in FIG. 9A, the ink outflow channel 114C is formed to extend rightward along the left-right direction 9 from the opening 115C at a location in front of the ink chambers 111B and 111M and reaches the opening 116C, penetrating through the right wall 102.

As depicted in FIG. 7, the ink outflow channel 114M communicates with the ink chamber 111M through an opening 115M provided near the lower end of the partition wall 107 which demarcates the right surface of the ink chamber 111M. The opening 115M is formed in the partition wall 107 at a location surrounded by the lower stage wall 146M and the connecting wall 147M (more specifically, at a location below the upper stage wall 145M and between the connecting walls 147M and 147B in the front-rear direction 8). Further, as depicted in FIG. 8, the ink outflow channel 114M reaches the right side surface of the ink tank 100 through an opening 116M provided on the right wall 102. More specifically, as depicted in FIG. 9A, the ink outflow channel 114M is formed to extend rightward along the left-right direction 9 from the opening 115M at a location in front of the ink chamber 111B and reaches the opening 116M penetrating through the right wall 102.

As depicted in FIG. 7, the ink outflow channel 114B communicates with the ink chamber 111B through an opening 115B provided near the boundary between the right wall 102 and the lower wall 105, which demarcates the right surface and the bottom surface, respectively, of the ink chamber 111B. The opening 115B is formed in the connecting wall 147B at a location surrounded by the lower stage wall 146B and the connecting wall 147B (more specifically, at a location below the upper stage wall 145B and behind the connecting wall 147B). A partition wall 110 crossing the inflow direction in which the ink is allowed to inflow into the opening 115B (namely, downward in the up-down direction 7) is provided at a position above the opening 115B. Further, as depicted in FIG. 8, the ink outflow channel 114B reaches the right side surface of the ink tank 100 through an opening 116B provided on the right wall 102.

Figure 6:
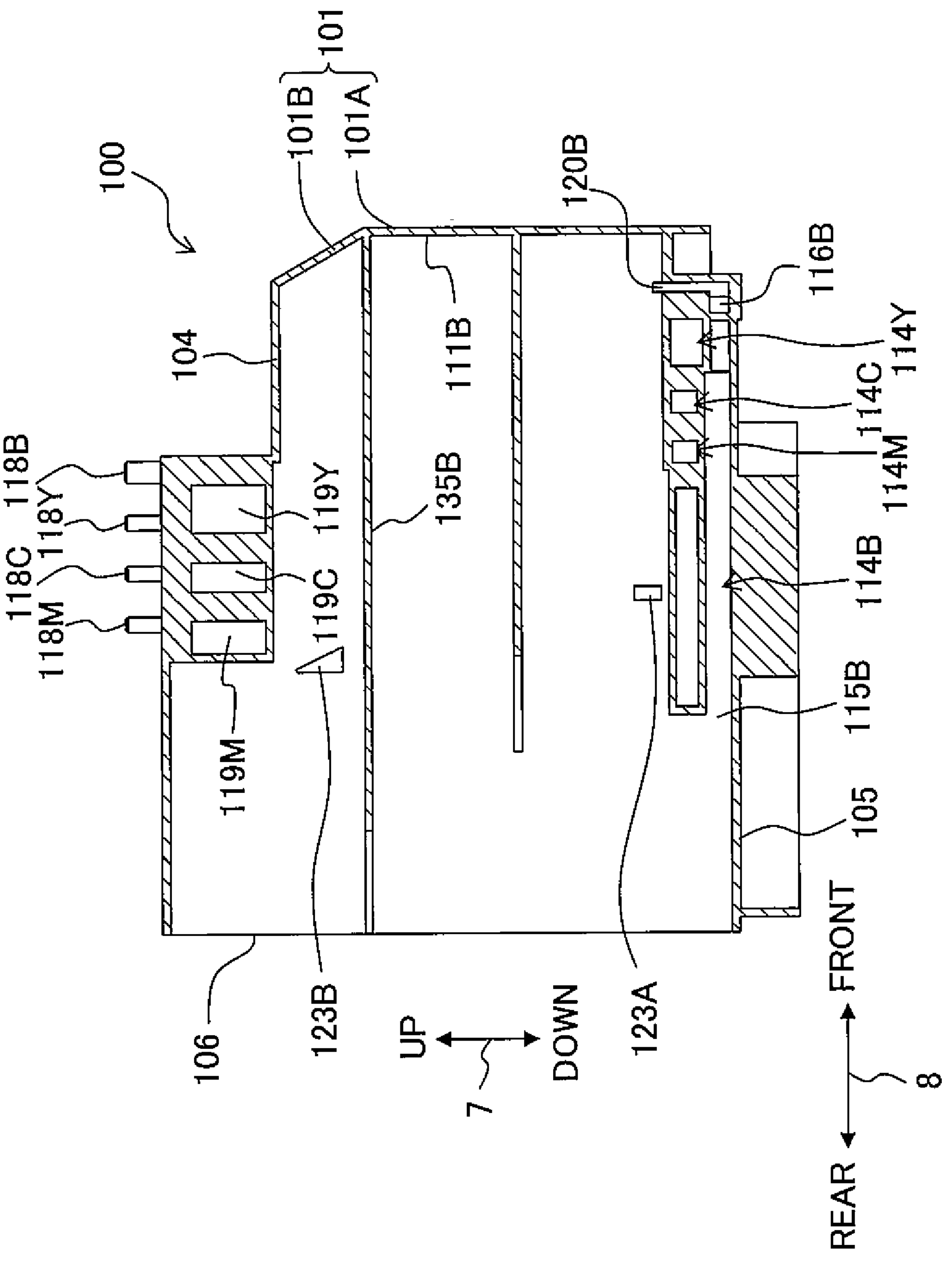
FIG. 6 is a cross-sectional view along a line VI-VI in FIG. 4.

As depicted in FIG. 6, the ink outflow channel 114B is formed to extend frontward from the opening 115B along the front-rear direction 8 and reaches the opening 116B through the right wall 102 at a position in front of the ink outflow channels 114M, 114C and 114Y. Further, the ink outflow channel 114B extended in the front-rear direction 8 crosses the ink outflow channels 114M, 114C, and 114Y extended in the left-right direction 9. More specifically, the ink outflow channel 114B is extended frontward at a position below the ink outflow channels 114M, 114C, and 114Y, extended in the left-right direction 9.

Note that as depicted in FIG. 7, a connecting wall 147 included in the connecting walls 147 and located closer to the left side than the other connecting walls 147 is positioned at the front side. Namely, the connecting wall 147Y is positioned in front of the connecting walls 147B, 147M, and 147C. The connecting wall 147C is positioned in front of the connecting walls 147B and 147M. The connecting wall 147M is positioned in front of the connecting wall 147B. Further, the ink outflow channel 114Y is disposed of in a space surrounded by the upper stage walls 145B, 145M, and 145C, and the connecting walls 147B, 147M, and 147C (namely, in the space below the upper stage walls 145B, 145M and 145C, in front of the connecting walls 147B, 147M and 147C and behind the connecting wall 147Y). The ink outflow channel 114C is disposed in a space surrounded by the upper stage walls 145B and 145M and the connecting walls 147B and 147M (namely, in the space below the upper stage wall 145B and 145M, in front of the connecting walls 147B and 147M and behind the connecting wall 147C). The ink outflow channel 114M is disposed of in a space surrounded by the upper stage wall 145B and the connecting wall 147B (namely, in the space below the upper stage wall 145B, in front of the connecting wall 147B and behind the connecting wall 147M).

[Ink Lead-Out Channel 117, Return Channel 119]

As depicted in FIG. 8, ink lead-out channels 117B, 117M, 117C, and 117Y are provided on the right side surface of the ink tank 100. One ends of the ink lead-out channels 117B, 117M, 117C, and 117Y are connected respectively to the ink outflow channels 114B, 114M, 114C, and 114Y corresponding thereto each at a position at which one of the openings 116B, 116M, 116C and 116Y is located; and the other ends of the ink lead-out channels 117B, 117M, 117C and 117Y are connected respectively to connecting sections 118B, 118M, 118C, and 118Y. The four ink tubes 32B, 32M, 32C, and 32Y, corresponding to inks of the four colors respectively, are connected to the connecting sections 118, each provided to project from the upper wall 104 of the ink tank 100 (see FIG. 3). Namely, the ink lead-out channels 117 are each a channel that guides the ink outflowed from the ink chamber 111 through the ink outflow channel 114 corresponding thereto to the recording head 39 through one of the ink tubes 32 connected to the connecting section 118 corresponding thereto. The volumes of the ink lead-out channels 117B, 117M, 117C, and 117Y are substantially the same as one another, and the volumes of the ink tubes 32B, 32M, 32C, and 32Y are substantially the same as one another.

Figure 9B:
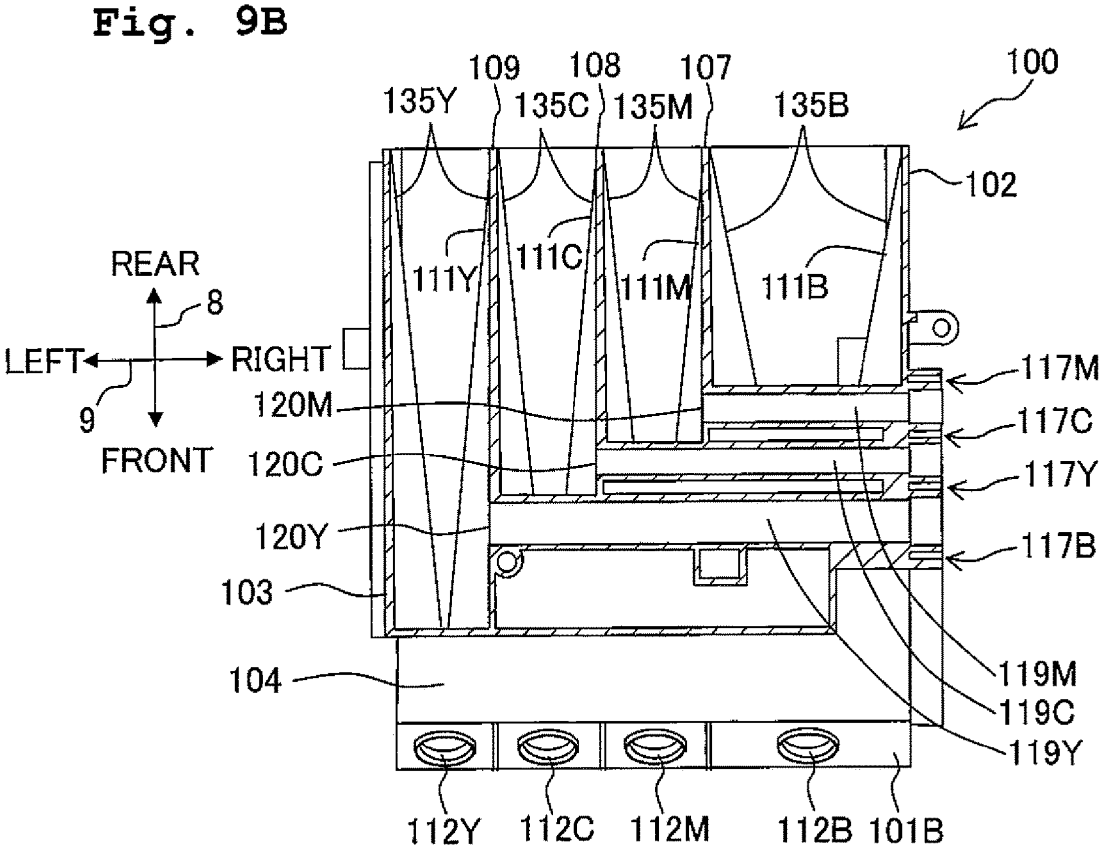
FIG. 9B is a cross-sectional view along a line IXB-IXB in FIG. 8.

Further, as depicted in FIGS. 8 and 9B, the right side surface of the ink tank 100 is provided with return channels 119B, 119M, 119C, and 119Y. One ends of the return channels 119B, 119M, 119C, and 119Y are connected to the ink outflow channels 114B, 114M, 114C, and 114Y, respectively, at positions of the openings 116B, 116M, 116C, and 116Y; and the other ends of the return channels 119B, 119M, 119C and 119Y communicate with the ink chambers 111 corresponding thereto through openings 120B, 120M, 120C and 120Y, respectively. Note that the openings 116 and 120 are provided at different positions in the up-down direction 7. More specifically, the openings 120 are provided each at a position above the opening 116 corresponding thereto in the up-down direction 7.

As depicted in FIG. 8, the right wall 102 of the ink tank 100 is provided with a plurality of projected walls 121A to 121I (hereinafter referred to collectively as a "projected wall(s) 121" in some cases). The projected wall 121 is projected rightward (toward the right side) from the outer surface of the right wall 102 (right side surface) and is extended along the outer surface of the right wall 102. Further, a film 122 (see FIG. 5) is attached by welding to the right side end portions of the projected walls 121. The single (common) film 122 is welded to the projected walls 121A to 121I of the present embodiment. The ink lead-out channels 117 and the return channels 119 define spaces demarcated by the adjacent projected walls 121A to 121H and by the film 122.

The projected walls 121A and 121B which demarcate the ink lead-out channel 117B are extended rearward from a position at which the projected walls 121A and 121B sandwich the opening 116B therebetween, and are further extended upward and reach an upper end portion of the ink tank 100. The projected walls 121C and 121D which demarcate the ink lead-out channel 117Y, the projected walls 121E and 121F which demarcate the ink lead-out channel 117C, and the projected walls 121G and 121H, which demarcate the ink lead-out channel 117M are extended downward from positions at each of which the projected walls 121C and 121D, the projected walls 121E and 121F or the projected walls 121G and 121H sandwich one of the opening 116Y, 116C and 116M corresponding thereto, and are further extended upward at the rear side of the openings 116Y, 116C and 116M respectively and reach the upper end portion of the ink tank 100. Namely, the ink lead-out channels 117Y, 117C, and 117M are connected to the ink outflow channels 114Y, 114C, and 114M corresponding thereto, respectively, each at a lower portion of one of the openings 116Y, 116C, and 116M. The lower portion of each of the openings 116Y, 116C, and 116M means a portion lower than (below) the central portion in the up-down direction 7 of each of the openings 116Y, 116C, and 116M. Furthermore, each of the ink lead-out channels 117 is connected to one of the connecting sections 118 corresponding thereto via a space (omitted in the drawings) extended in the up-down direction 7 and the left-right direction 9 in the interior of the ink tank 100.

The projected walls 121A and 121B which demarcate the return channel 119B, the projected walls 121B and 121C which demarcate the return channel 119Y, the projected walls 121D and 121E which demarcate the return channel 119C, and the projected walls 121F and 121G which demarcate the return channel 119M are extended upward from the positions at each of which the projected walls 121A and 121B, the projected walls 121B and 121C, the projected walls 121D and 121E or the projected walls 121F and 121G sandwich one of the openings 116 corresponding thereto. Namely, the return channel 119 is connected to the corresponding ink outflow channel 114 at an upper portion of the opening 116. The upper portion of the opening 116 means a portion higher than or above the central portion in the up-down direction 7 of the opening 116. Further, as depicted in FIG. 9B, each of the return channels 119 is extended toward the left side in the left-right direction 9 in the interior of the ink tank 100 and communicates with the corresponding ink chamber 111 through the opening 120.

[Additional Ink Chamber 123]

Further, as depicted in FIG. 8, the right side surface of the ink tank 100 is provided with an additional ink chamber 123. The additional ink chamber 123 is a space that is demarcated by the projected walls 121H and 121I, continued in the peripheral direction of the ink tank 100, and by the film 122. The additional ink chamber 123 communicates with the ink chamber 111B via through holes 123A and 123B penetrating through the right wall 102. The through hole 123B is provided at a position above the through hole 123A in the up-down direction 7. The additional ink chamber 123 is provided with a portion to be detected (detection-target portion) 124 formed in the additional ink chamber 123 by allowing a portion of the projected wall 121I, which demarcates the lower end of the additional ink chamber 123, to surround the front side, the rear side and the lower side of the through hole 123A.

[Optical Sensor 125]

As depicted in FIGS. 4 and 8, the multi-function peripheral 10 includes an optical sensor 125 having a light emitting unit 125A and a light receiving unit 125B facing each other in the front-rear direction 8 in a state that the light emitting unit 125A and the light receiving unit 125B sandwich the detection-target portion 124 therebetween. The light emitting unit 125A outputs a light that is transmissive through the projected wall 121I but not transmissive through the black ink (for example, a visible light, an infrared light, etc.) toward the light receiving unit 125B. The light receiving unit 125B outputs, to a controller, a high-level signal in response to having received light outputted from the light emitting unit 125A. The high-level signal means a "signal having a signal level not less than a threshold value". On the other hand, the light receiving unit 125B outputs, to the controller, a low-level signal in response to not having received any light. The low-level signal means a "signal having a signal level less than a threshold value". Note that the threshold value of the high-level signal and the threshold value of the low-level signal may be the same. Alternatively, the threshold value of the high-level signal may be set to be higher than the threshold value of the low-level signal.

[Atmosphere Communicating Channel 126]

As depicted in FIG. 5, atmosphere communicating channels 126B, 126M, 126C, and 126Y (hereinafter collectively referred to as "atmosphere communicating channel(s) 126") are connected to the ink chambers 111, respectively. The atmosphere communicating channel 126 allows the ink chamber 111 corresponding thereto to communicate with the atmosphere. More specifically, the atmosphere communicating channel 126 communicates with the corresponding ink chamber 111 through a notch 127 and communicates with the outside of the ink tank 100 through an opening 132. The atmosphere communicating channel 126 is a channel passing through the internal space (not depicted in the drawings) of the ink tank 100 and reaching the opening 132 via the notch 127. Further, the atmosphere communicating channel 126 allows the air to inflow and outflow between the ink chamber 111 and the outside of the ink tank 100.

[Partition Wall 135]

As depicted in FIG. 6 and FIG. 9B, the interior of each of the ink chambers 111 is provided with partition walls 135B, 135M, 135C, or 135Y (hereinafter collectively referred to as "partition wall(s) 135") spreading (spanning) in the front-rear direction 8 and the left-right direction 9. The partition wall 135B is connected to the front wall 101, the right wall 102, the film 106, and the partition wall 107. The partition wall 135M is connected to the front wall 101, the film 106, and the partition walls 107 and 108. The partition wall 135C is connected to the front wall 101, the film 106, and the partition walls 108 and 109. The partition wall 135Y is connected to the front wall 101, the left wall 103, the film 106, and the partition wall 109. The partition wall 135 divides a part of the corresponding ink chamber 111 in the up-down direction 7. Namely, the partition wall 135 is separated and away from the upper wall 104 and the lower wall 105, and there is a space on the upper side and the lower side in the vertical direction 7 of the partition wall 135. Since the shapes of the partition walls 135B, 135M, 135C and 135Y are substantially same, a detailed explanation will be given below regarding the partition wall 135B with reference to FIGS. 6 and 10.

As depicted in FIG. 6, the partition wall 135B is formed to extend from the inner surface of the front wall 101, at a position below the inlet 112, in a direction crossing the front wall 101 (namely, to extend rearward in the front-rear direction 8). The partition wall 135B makes contact with the front wall 101 at the boundary between the base wall 101A and the inclined wall 101B. In this embodiment, the position of the upper end of the partition wall 135B and the position of the boundary between the base wall 101A and the inclined wall 101B in the up-down direction 7 coincide with each other. Although the partition wall 135B of the embodiment is formed to extend substantially in the horizontal direction, the orientation of the partition wall 135B is not limited to this. For example, the partition wall 135 may be inclined downward and rearward in the front-rear direction 8.

Figure 10:
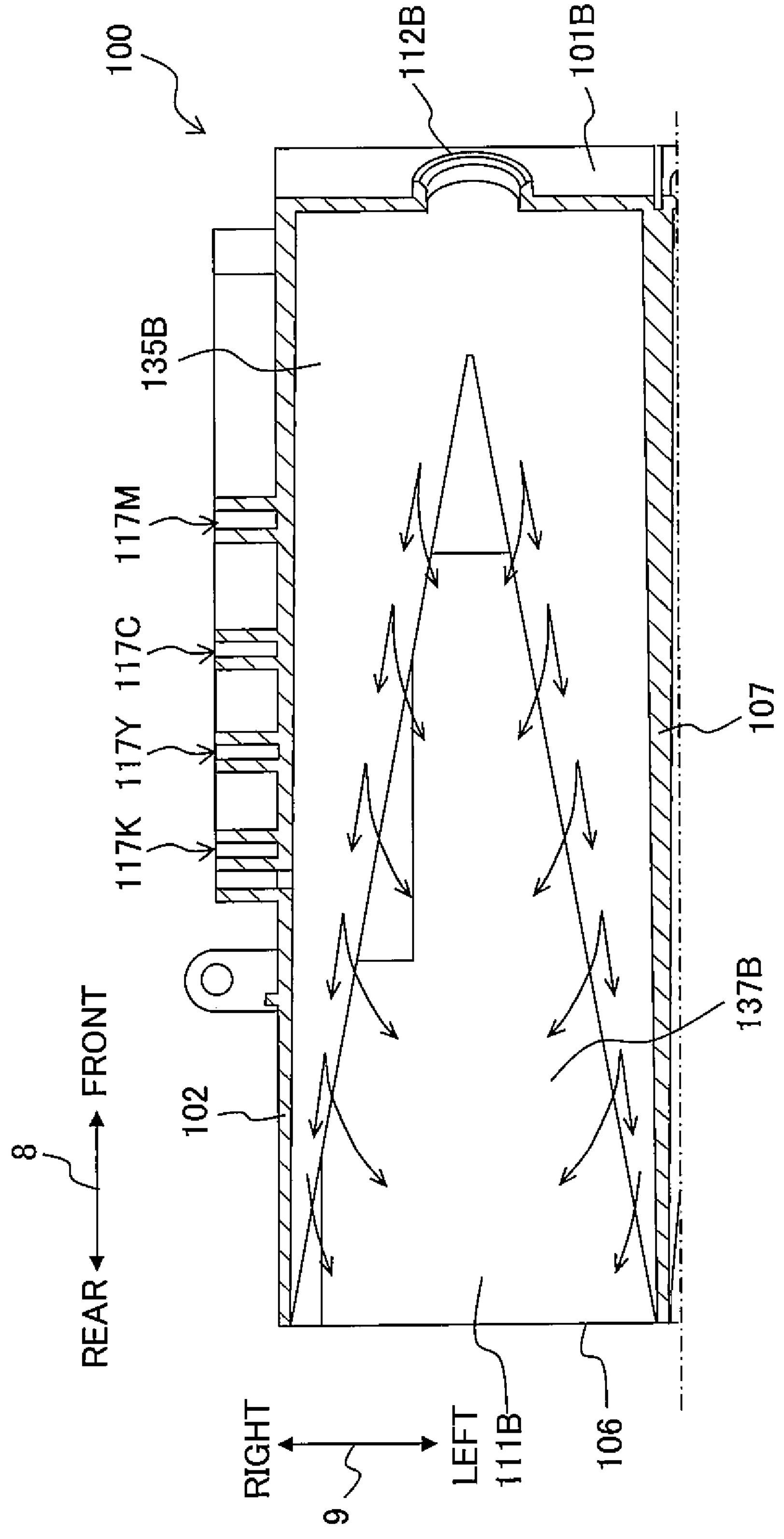
FIG. 10 is a cross-sectional view of an ink chamber 111B as viewed at the position of an inlet 112B.

Further, as depicted in FIG. 10, the partition wall 135B is provided with an opening 137B formed therein to allow the spaces above and below the partition wall 135B in the ink chamber 111B to communicate with each other. The area of the opening 137B (in the example of FIG. 10, the width of the opening in the left-right direction 9) progressively increases as separating farther away from the front wall 101 (namely, the area of the opening 137B increases progressively rearward in the front-rear direction 8). Furthermore, the shape of the opening 137B is symmetrical relative to the direction separating away from the front wall 101 along the partition wall 135B. The shape of the opening 137B in this embodiment is an isosceles triangle, in which the vertical apex is oriented frontward. Namely, the partition wall 135B has such a shape that the length in the front-rear direction 8 of the central portion in the left-right direction 9 of the partition wall 135B is relatively short, and the length in the front-rear direction 8 of the both end portions in the left-right direction 9 of the partition wall 135B is relatively long.

Figure 11A:
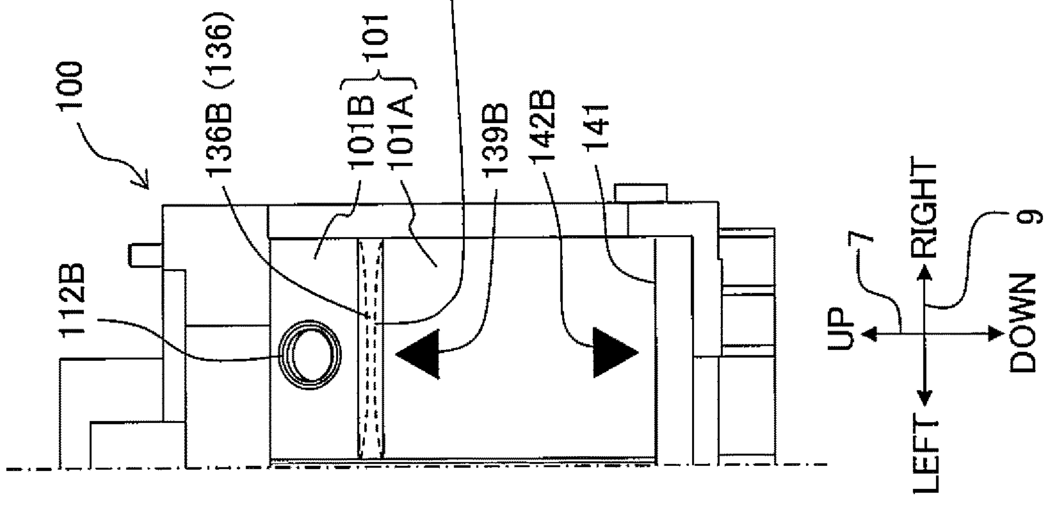

As indicated by broken lines in FIG. 11A, a base end portion 136B extends in the entire area of the ink chamber 111B along the left-right direction 9. Further, the base end portion 136B is visible (visually observable), transmitting through the front wall 101 from the outside of the ink tank 100. Further, the base end portion 136B of the embodiment functions as the upper limit, indicating line 138. Namely, in the embodiment, the position of the base end portion 136B and the position of the upper limit indicating line 138 in the up-down direction 7 coincide with each other. On the other hand, the information sign 139 is drawn on the outer surface of the front wall 101. A method for drawing the information sign 139 on the outer surface of the front wall 101 may be, for example, the same as the method for drawing the information sign 142.

In the ink tank 100 of the embodiment, the thickness of the base end portion 136B in the up-down direction 7 is relatively thin at the central portion in the left-right direction 9 and is relatively thick at both end portions in the left-right direction 9. Namely, the partition wall 135B, which is formed by the injection molding, has such a configuration that the thickness in the up-down direction 7 is made to be thin at the central portion in the left-right direction 9 at which the length in the front-rear direction 8 is small, and that the thickness in the up-down direction 7 is made to be thick at both end portions in the left-right direction 9 at which the length in the front-rear direction 8 is long.

Figure 11B:
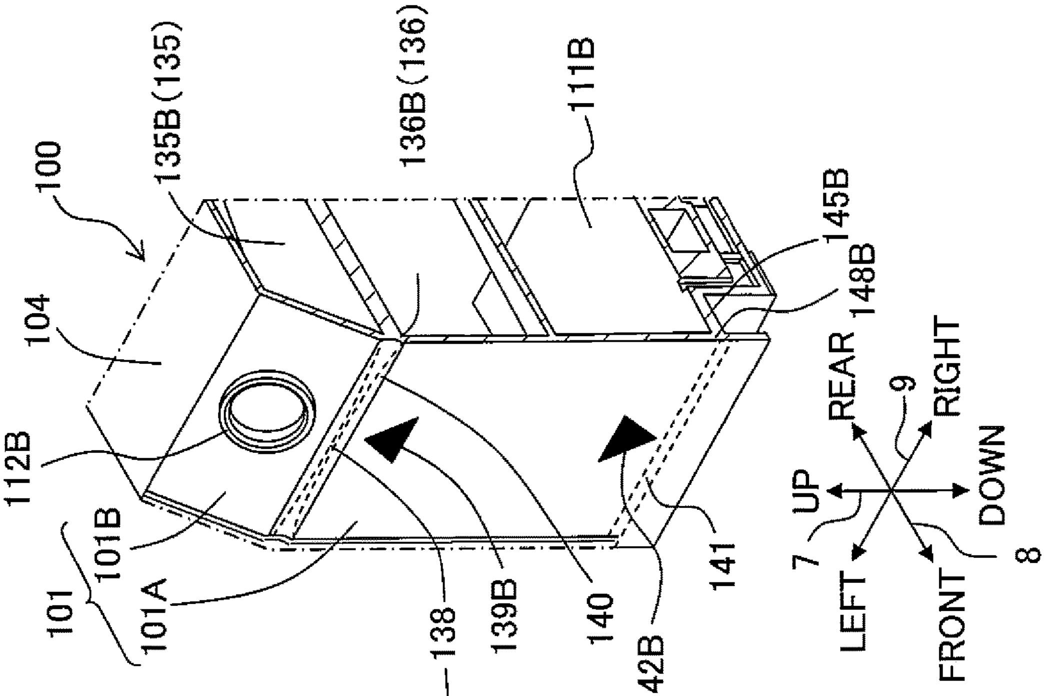

Further, in the ink tank 100 of the embodiment, as depicted in FIG. 11B, a groove 140 extending along the left-right direction 9 is formed on the outer surface of the front wall 101 at a portion or location corresponding to the base end portion 136B. Namely, the thickness in the front-rear direction 8 of the front wall 101 at the location formed with the partition wall 135B is made to be thinner than other portions of the front wall 101, different from the location formed with the partition wall 135B. The groove 140 may be, for example, a sink mark (molding sink) of a resin generated on the outer surface of the front wall 101 at a location corresponding to the partition wall 135B during the injection molding.

According to the embodiment as described above, it is possible to make a user who is visually observing the inside of the ink chamber 111 through the front wall 101 recognize the necessity for replenishing the ink by means of the liquid level of the ink stored in the ink chamber 111 which has lowered as low as the position of the lower limit indicating line 141 (namely, the position of the upper stage wall 145). Note that although the ink is still stored in the space surrounded by the lower stage wall 146 and the connecting wall 147, the opening 115 is provided in this space. Therefore, even in the case that the ink is discharged by the recording head 39 in a state where the liquid level of the ink has lowered to the position of the lower limit indicating line 141, it is possible to suppress any entering and mixing of the air into the ink allowed to flow out to the ink outflow channel 114 via the opening 115.

Further, according to the embodiment as described above, since it is possible to make the user recognize the necessity for refilling the ink to each of the ink chambers 111, there is no need to provide any remaining amount sensor, which detects the ink remaining amount, to each of the ink chambers 111. The above-described embodiment is provided only with the additional ink chamber 123 and the optical sensor 125 for the purpose of detecting the ink remaining amount of the ink chamber 111B storing the black ink of which consumption amount is greatest among the inks of different colors. Furthermore, it is also allowable to perform, by a non-illustrated controller, counting of the ink amount for each of the color inks discharged by the recording head 39 and to notify the user that the remaining ink amount of a certain ink among the color inks is small under a condition that the count value for the certain ink has exceeded a threshold value. By doing so, it is possible to urge the user to confirm the ink remaining amount.

Further, the ink tank 100 in the above-described embodiment is formed by pulling, in the rearward direction, the mold which arranges the lower stage wall 146 located behind the upper stage wall 145 at the position below the upper stage wall 145 and which defines the inner profile (internal shape) of the ink tank 100 (namely, the shape of the upper surface of the lower wall 105). As a result, the structure of the mold for shaping the ink tank 100 can be simplified. Furthermore, by forming the ink outflow channel 114 in the space surrounded by the upper stage wall 145 and the connecting wall 147, the space around the ink tank 100 can be effectively utilized. As a result, it is possible to allow the ink chamber 111 to have a large volume without increasing the size of the ink tank 100, or to reduce the size of the ink tank 100 without decreasing the size of the ink chamber 111.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Moreover, the embodiment has been explained by way of an example wherein the base end portion 148 of the upper stage wall 145, which can be visually observable from the outside of the ink tank 100 through the front wall 101, having the light transmittance or translucency, is used as the lower limit indicating line 141. With this, there is no need to provide an independent step for forming the lower limit indicating line 141, thereby making it possible to simplify the production process of the ink tank 100. The method for forming the lower limit indicating line 141, however, is not limited to the above example. It is also allowable, for example, to draw the lower limit indicating line 141 on the outer surface of the front wall 101. It is sufficient that the position of the lower limit indicating line 141 to be formed on the front wall 101 is located be the same as the position of the lower end of the upper stage wall 145 or located above the lower end of the upper stage wall 145 in the vertical direction. The method for drawing the lower limit indicating line 141 on the outer surface of the front wall 101 may be, for example, common to that for providing the information signs 139 and 142.

Further, the base wall 101A may be divided (segmented) into first and second areas, which are adjacent in the up-down direction 7. The first area located below the second area includes the lower limit, indicating line 141. The second area located above the first area has a light transmittance higher than that of the first area. The specific method for making the light transmittance be different between the first and second areas is not specifically limited. There are conceived, however, such a method for making the thickness of the base wall 101A in the second area thinner than that in the first area, a method for making the surface roughness of the outer surface of the base wall 101A in the first area to be coarser than that in the second area, etc. With this, the ink stored in the space surrounded by the lower stage wall 146 and the connecting wall 147 can be difficult for the user to see through the front wall 101.

Furthermore, according to the embodiment, the ink chamber 111 is partitioned or divided in the up-down direction 7 by the partition wall 135. Accordingly, even if the liquid level inside the ink chamber 111 is raised in a state where any air bubbles are generated inside the ink chamber 111, it is possible to suppress any overflow of the air bubbles from the inlet 112. Moreover, by forming the upper limit indicating line 138 and the information sign 139 on the front wall 101 exposed to the outside of the multi-function peripheral 10, it is possible to easily make the user recognize the position of the liquid level at which any air bubbles might outflow from the inlet 112. Note that the method for forming the upper limit indicating line 138 is not limited to the above example. It is allowable, for example, to draw the upper limit indicating line 138 on the outer surface of the front wall 101. It is sufficient that the position of the upper limit indicating line 138 to be formed on the front wall 101 overlaps with the base end portion 136 in the up-down direction 7 and is located to be the same as the position of the upper end of the base end portion 136, or located below the upper end of the base end portion 136 in the vertical direction 7. Note that in FIG. 1A, the upper limit indicating line 138 and the information sign 139 may be concealed by the cover 70. Further, the partition wall 135 can be omitted.

Furthermore, in the above embodiment, although an explanation of the ink is given as an example of the liquid, the present teaching is not restricted to this. Namely, instead of the ink, the liquid may be a pretreatment liquid, which is to be discharged onto a recording paper before jetting an ink at the time of printing or may be water, etc., which is to be sprayed in the vicinity of the nozzles 40 of the recording head 39 for preventing drying of the nozzles 40 of the recording head 39.

What is claimed is:

1. A tank configured to store a liquid which is to be supplied to a liquid consuming apparatus, the tank comprising:

a wall defining a liquid storage chamber configured to store the liquid, the wall including:

an upper wall extending in a front-rear direction;

a front wall extending in an upper-lower direction, the front wall being located below the upper wall in the upper-lower direction;

a first lower wall extending rearward from the front wall; and a second lower wall extending rearward from a position away rearward from the front wall, the second wall being located below the first lower wall in the upper-lower direction;

an inlet which penetrates through the upper wall or the front wall and via which the liquid is flowed into the liquid storage chamber;

an outlet via which the liquid is flowed out; and a liquid lead-out channel configured to flow the liquid flowed out from the outlet to the liquid consuming apparatus, wherein the outlet is located between the first lower wall and the second lower wall in the upper-lower direction.

2. The tank according to claim 1, wherein the outlet is closer to the second lower wall than the first lower wall in the upper-lower direction.

3. The tank according to claim 1, wherein the outlet is closer to a front end of the second lower wall than a rear end of the second lower wall.

4. The tank according to claim 1, wherein the front wall includes:

an erected wall extending in the upper-lower direction, the erected wall being connected to the first lower wall; and an inclined wall connected to an upper end of the erected wall and to a front end of the upper wall.

5. The tank according to claim 1, wherein the front wall is configured such that the liquid stored in the liquid storage chamber is visible through the front wall from an outside of the tank.

6. The tank according to claim 1, wherein the front wall includes a lower limit indicating line.

7. The tank according to claim 6, wherein the lower limit indicating line is formed on an outer surface of the front wall.

8. The tank according to claim 1, wherein the wall further includes a connecting wall connecting the first lower wall and the second lower wall.

9. The tank according to claim 1 further comprises a connecting portion to which a tube connected to the liquid consuming apparatus is connected, the connecting portion being located on the upper wall, wherein the liquid lead-out channel communicates with the connecting portion.

10. The tank according to claim 1 further comprises a rear wall extending in the upper-lower direction at a rear side than the front wall, wherein a length of the front wall in a left-right direction that is orthogonal to the upper-lower direction and the front-rear direction is smaller than a distance from the front wall to the rear wall in the front-rear direction.

* * * * *